US008666894B1

(12) United States Patent
Buch et al.

(10) Patent No.: US 8,666,894 B1
(45) Date of Patent: Mar. 4, 2014

(54) SYSTEMS AND METHODS FOR REMOTELY AUTHENTICATING CREDIT CARD TRANSACTIONS

(75) Inventors: Amit Buch, Plano, TX (US); Steven Dale Zettner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/248,790

(22) Filed: Sep. 29, 2011

Related U.S. Application Data

(63) Continuation of application No. 11/480,630, filed on Jun. 30, 2006, now Pat. No. 8,078,538.

(51) Int. Cl.
*G06Q 30/00* (2012.01)
(52) U.S. Cl.
USPC .............. 705/44; 705/35; 705/39; 705/26.82; 713/155; 713/168; 455/10; 455/456.6; 726/2; 726/3; 726/4; 726/5

(58) Field of Classification Search
USPC ............................ 726/2–5; 455/5, 10, 456.6; 705/26.1–27.2, 35–44
See application file for complete search history.

(56) References Cited

U.S. PATENT DOCUMENTS

| 5,365,046 | A | 11/1994 | Haymann |
| 6,615,194 | B1 | 9/2003 | Deutsch et al. |
| 7,221,949 | B2 | 5/2007 | Clough |
| 8,220,034 | B2 * | 7/2012 | Hahn et al. .................. 726/5 |
| 2002/0091633 | A1 | 7/2002 | Proctor |
| 2002/0108062 | A1 | 8/2002 | Nakajima et al. |
| 2003/0135463 | A1 | 7/2003 | Brown et al. |
| 2003/0182194 | A1 | 9/2003 | Choey et al. |
| 2004/0122685 | A1 | 6/2004 | Bunce |
| 2004/0209596 | A1 | 10/2004 | Wong et al. |
| 2004/0219904 | A1 | 11/2004 | De Petris |
| 2004/0254868 | A1 | 12/2004 | Kirkland et al. |
| 2006/0026108 | A1 | 2/2006 | Wilson et al. |
| 2006/0059110 | A1 | 3/2006 | Madhok et al. |
| 2006/0131385 | A1 | 6/2006 | Kim |
| 2006/0136332 | A1 | 6/2006 | Ziegler |
| 2008/0222038 | A1 | 9/2008 | Eden et al. |

FOREIGN PATENT DOCUMENTS

WO     WO 03/079258 A1     9/2003

OTHER PUBLICATIONS

CardServ Inc., "Fraud Protection," 1 page, 2006.
ChoicePoint Asset Company, "Real-World Case Scenarios," 4 pages, 2005.
EVS, "Authentication—Permissible Use," 2 pages, 2006.
EVS, "Online Identity Verification," 2 pages, 2006.
VarilogiX.com, "Fraud Call: How It Works," 2 pages, 2005.

* cited by examiner

*Primary Examiner* — Andrew L Nalven
*Assistant Examiner* — Amir Mehrmanesh
(74) *Attorney, Agent, or Firm* — Perkins Coie LLP (57) ABSTRACT

A system for remotely authenticating credit card transactions of a consumer comprises at least one subsystem that alerts the consumer via a communication device of the consumer when a credit card transaction that meets certain criteria is being attempted on the consumer's credit card account. Also, a system for remotely authenticating credit card transactions of a consumer may comprise at least one subsystem that receives an authorization request from a merchant for completing the credit card transaction and at least one subsystem that disallows the transaction to complete if a response is received from the consumer rejecting the transaction. The communication device may be a cell phone, computer, PDA, land line telephone, or any other communication device.

17 Claims, 9 Drawing Sheets

SYSTEMS AND METHODS FOR REMOTELY AUTHENTICATING CREDIT CARD TRANSACTIONS

CROSS REFERENCE TO RELATED APPLICATIONS

This application is a continuation and claims the benefit of co-pending commonly assigned U.S. patent application Ser. No. 11/480,630 filed Jun. 30, 2006, the entire disclosure of which is herein incorporated by reference for all purposes.

This application is related to the following commonly-assigned patent applications, the entire contents of which are hereby incorporated in this present application by reference: U.S. patent application Ser. No. 11/479,460 filed Jun. 30, 2006, entitled "Systems and Methods for Remotely Authenticating Credit Card Transactions"; and U.S. patent application Ser. No. 11/480,633, filed on Jun. 30, 2006, entitled "Systems and Methods for Remotely Authenticating Credit Card Transactions".

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2006, USAA.

BACKGROUND

Credit card fraud and theft detection are becoming increasingly more important due in part to the proliferation of credit card use online resulting in personal credit card information becoming easier to obtain for illegal or unauthorized purposes. Often, attempts to detect and deter unauthorized credit card use results in the credit card being automatically blocked when unusual or otherwise suspect spending or charges occurs. Often, the credit card holder must then contact the credit card company to remove the block if the transactions are in fact authorized. This is inconvenient for the credit card holder as they may not know their card is being blocked until they try to make another valid transaction, and then must spend time trying to contact the credit card company to remove the block on their card (often while waiting to make the valid transaction).

Also, the credit card company may allow suspect transactions to occur and then follow up later with a phone call to the credit card holder to validate the transactions. However, if the transactions were in fact fraudulent, then the credit card company would have lost the opportunity to avoid the fraudulent transactions and perhaps stop the perpetrator in the act.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, remotely authenticating credit card transactions is provided. For several embodiments, a system for remotely authenticating credit card transactions of a consumer comprises at least one subsystem that alerts the consumer via a communication device of the consumer when a credit card transaction that meets certain criteria is being attempted on the consumer's credit card account.

Also, a system for remotely authenticating credit card transactions of a consumer may comprise at least one subsystem that receives an authorization request from a merchant for completing the credit card transaction and at least one subsystem that disallows the transaction to complete if a response is received from the consumer rejecting the transaction.

Below is a description of other advantages and features of the invention.

BRIEF DESCRIPTION OF THE DRAWINGS

Systems and methods for remotely authenticating credit card transactions is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Devices

Figure 1:
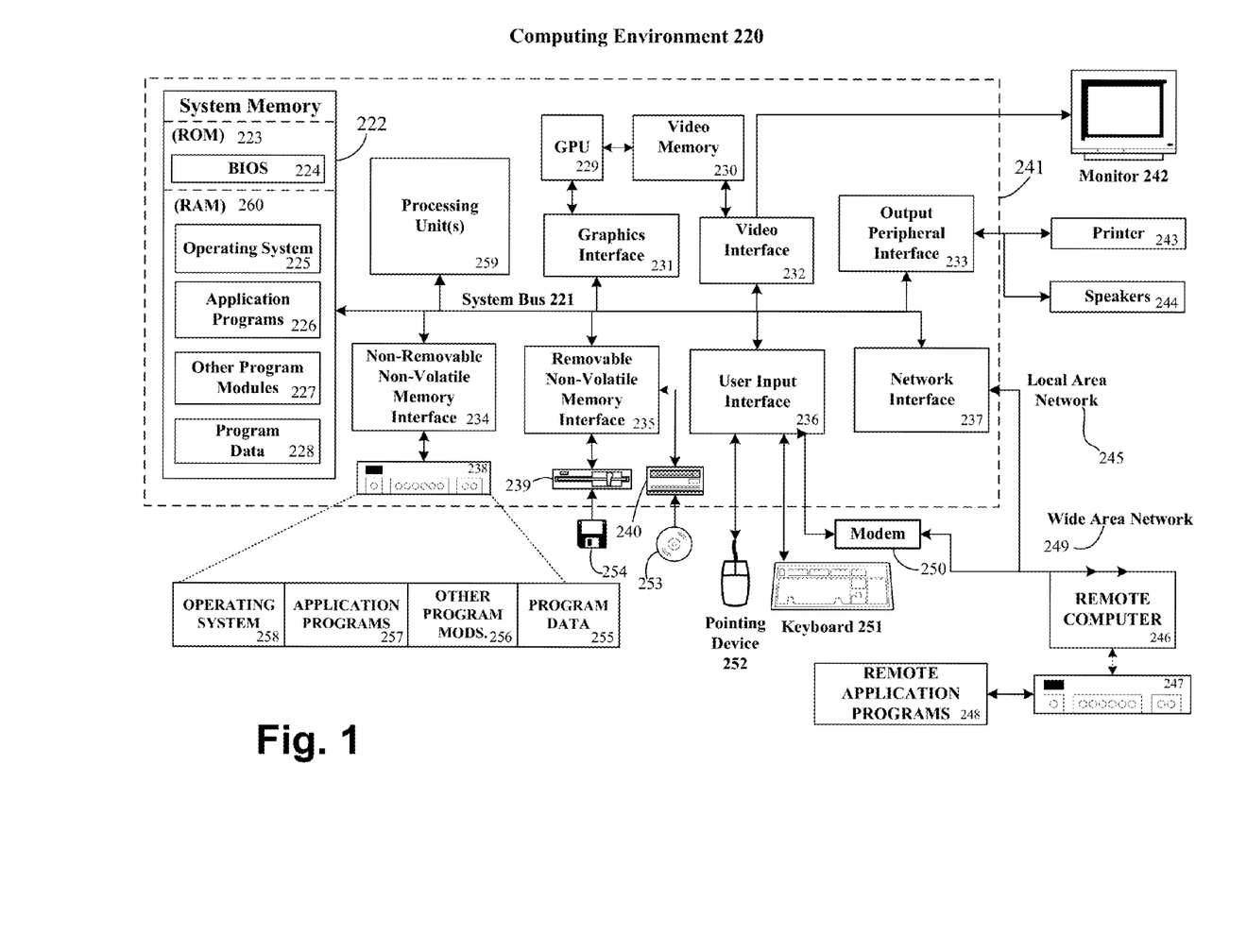
FIG. 1 is a block diagram representing an exemplary computing device suitable for use in conjunction with providing systems and methods for remotely authenticating credit card transactions.

Referring to FIG. 1, shown is a block diagram representing an exemplary computing device suitable for use in conjunction with implementing the processes described above. For example, the computer executable instructions that carry out the processes and methods for remotely authenticating credit card transactions may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad.

Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
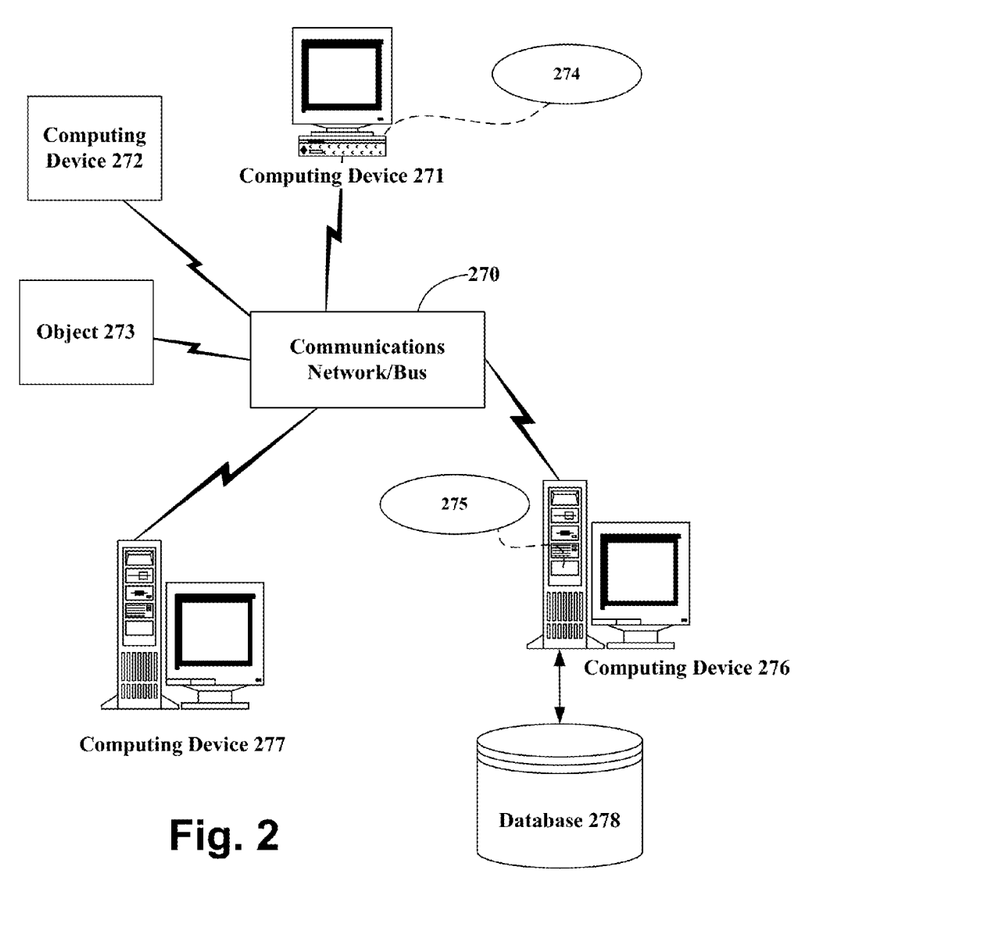
FIG. 2 illustrates an exemplary networked computing environment in which many computerized processes may be implemented to perform remote authentication of credit card transactions.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing remote authentication of credit card transactions. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Remote Authentication of Credit Card Transactions

Figure 3:
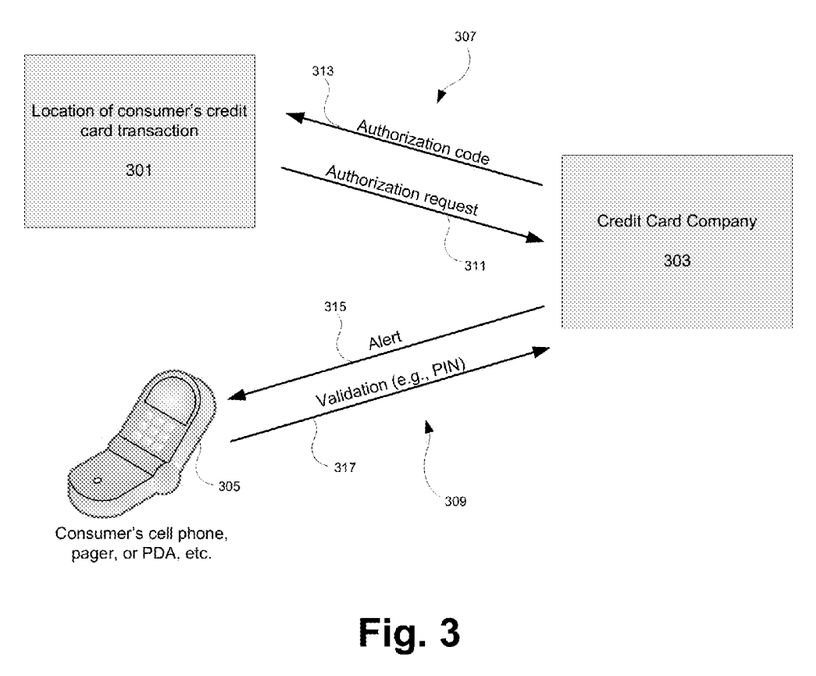
FIG. 3 is a block diagram illustrating a high level view of an example system for remotely authenticating credit card transactions wherein the transaction is validated by a consumer.

Referring next to FIG. 3, shown is a block diagram illustrating a high level view of an example system for remotely authenticating credit card transactions wherein the transaction is validated by a consumer. Shown are the location of the consumer's credit card transaction 301, the credit card company 303, and the consumer's communication device 305 (e.g., cell phone, telephone, personal digital assistant (PDA), pager, computer, etc.). The location of the consumer's credit card transaction will usually be at the location of a merchant for the product or service the consumer is purchasing. For example, this may be a store, restaurant, service center, business location or anywhere credit cards are accepted. It may also be that the consumer or consumer's communication device 305 is not at the same location where the transaction is being performed by the merchant 301. For example, the consumer may be making a credit card purchase over the phone or over the Internet. There may also be automatic credit card charges being made to the credit card such as for recurring subscriptions fees, membership dues, bills, etc. The location of these transactions 301 will often not be where the consumer or consumer's communication device 305 is located. The credit card company 303 is likely remote from both the consumer's communication device 305 and the location of the consumer's credit card transaction 301. However, there is a communication link 307 309 (either wired or wireless) between the credit card company 303 and the location of the consumer's credit card transaction 301 and between the credit card company 303 and the consumer's communication device 305. For example, the communications link 309 between the credit card company 303 and the consumer's communication device 305 may be through a telecommunications link such as over a wireless cellular phone network. However, other the links 307 309 may be through other communications networks and mediums or a combination of other communications networks and mediums as well including, but not limited to: normal telephone network, Internet or other computer network, cable, satellite, radio, paging systems, etc.

An authorization request is sent from the location of the consumer's credit card transaction 301 over the communications link 307 to the credit card company 303. The credit card company may then send an alert 315 to the consumer's communication device 305. The consumer may then respond to the alert 315 validating 317 the transaction for which the authorization request 311 was sent. This validation 317 may be in the form of sending a personal identification number (PIN) 317 which may or may not have been included in the alert 315. The validation 317 may take other forms as well that identify to the credit card company 303 the consumer has intended to approve or otherwise validate the transaction. For example, this may be through a menu choice provided to the consumer via the alert 315 or via the consumer's communication device 305. The credit card company may then send an authorization code or other message 313 to the location of the consumer's credit card transaction to indicate to the merchant the transaction is allowed to complete.

Figure 4:
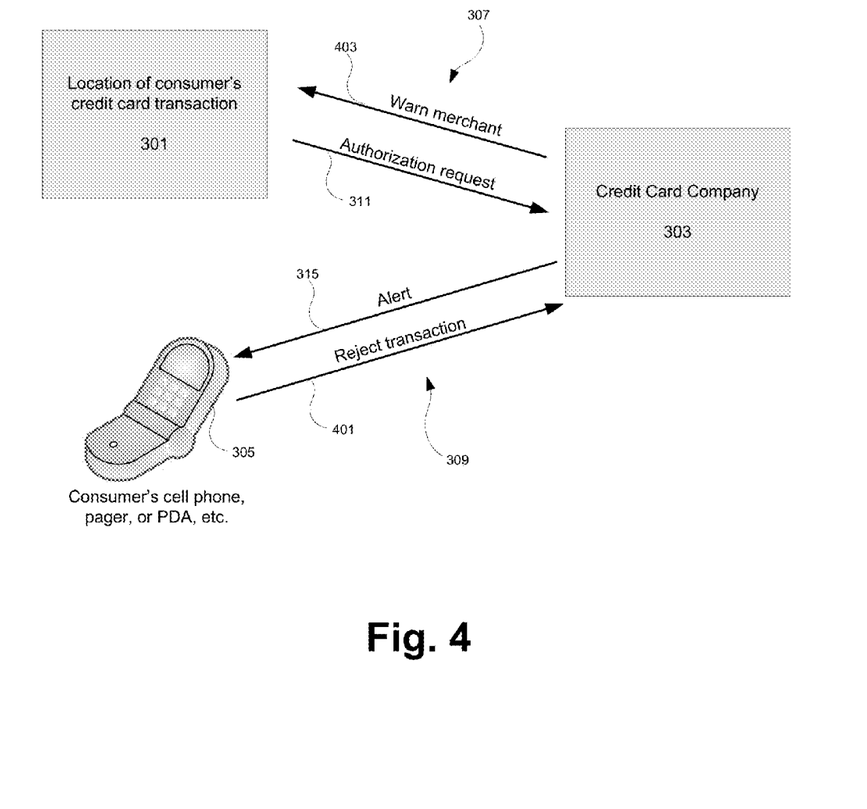
FIG. 4 is a block diagram illustrating a high level view of an example system for remotely authenticating credit card transactions wherein the transaction is rejected by a consumer.

Referring next to FIG. 4, shown is a block diagram illustrating a high level view of an example system for remotely authenticating credit card transactions wherein the transaction is rejected by a consumer. Shown are the location of the consumer's credit card transaction 301, the credit card company 303, and the consumer's communication device 305 (e.g., cell phone, telephone, personal digital assistant (PDA), pager, computer, etc.).

An authorization request 311 is sent from the location of the consumer's credit card transaction 301 over the communications link 307 to the credit card company 303. The credit card company may then send an alert 315 to the consumer's communication device 305. This alert may take the form of or be in a format of any number of types of messages or communications including but not limited to: a phone call, voicemail, text message, email, a page or pager message, instant message, pop-up message, ring tone, etc. The consumer may then respond to the alert 315 validating 317 the transaction for which the authorization request 311 was sent (as shown in FIG. 3), not respond at all to the alert (not shown), or respond with a rejection of the transaction 401 (shown in FIG. 4). This rejection 401 may be in the form of sending a rejection code which may or may not have been included in the alert 315. The rejection message 401 may take other forms as well that identify to the credit card company the consumer has intended to not allow or otherwise reject the transaction. For example, this may be through a menu choice provided to the consumer via the alert 315 or via the consumer's communication device 305. The credit card company may then send a rejection message, warning message or other message 403 to the location of the consumer's credit card transaction to indicate to the merchant the transaction is not allowed to complete and to perhaps take additional security measures to collect the card and/or round up the suspect that may be using the credit card in an unauthorized or illegal manner.

Figure 5:
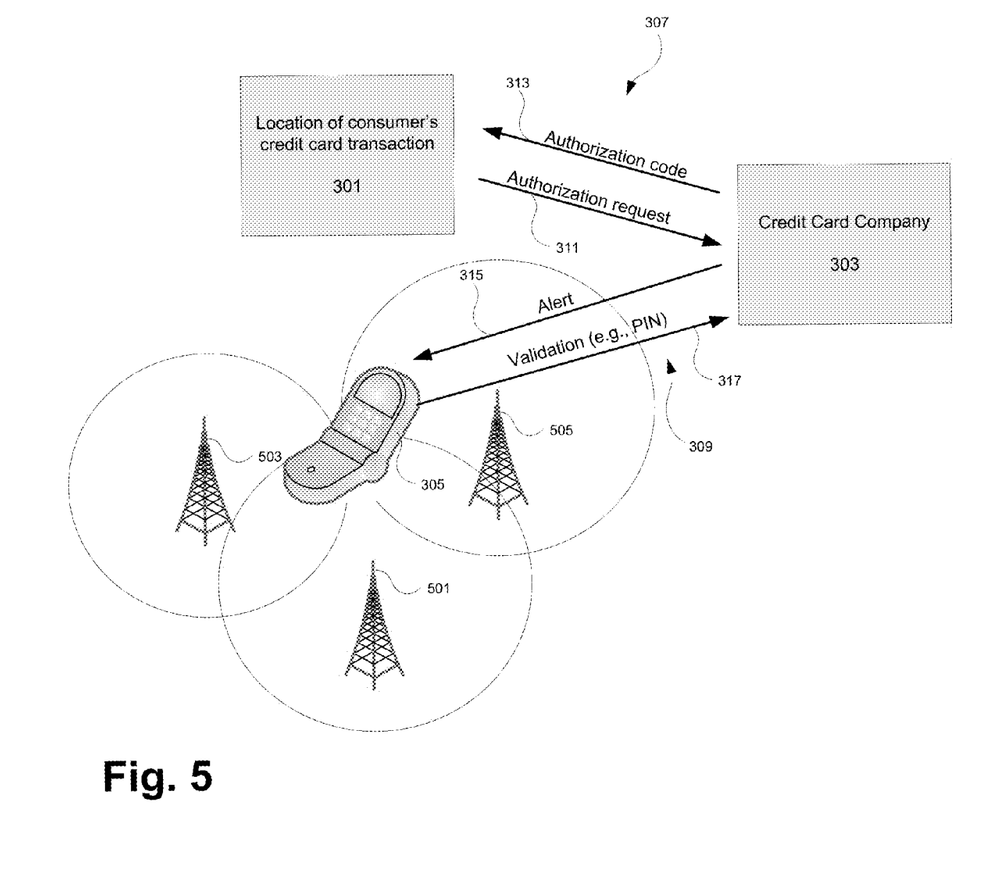
FIG. 5 is a block diagram illustrating a high level view of an example system for remotely authenticating credit card transactions using the location of the consumer's cell phone.

Referring next to FIG. 5, shown is a block diagram illustrating a high level view of an example system for remotely authenticating credit card transactions using the location of the consumer's cell phone. Shown are the location of the consumer's credit card transaction 301, the credit card company 303, the consumer's communication device 305 (e.g., cell phone, telephone, personal digital assistant (PDA), pager, computer, etc.), and three example cell phone towers 501 503 505.

Figure 6:
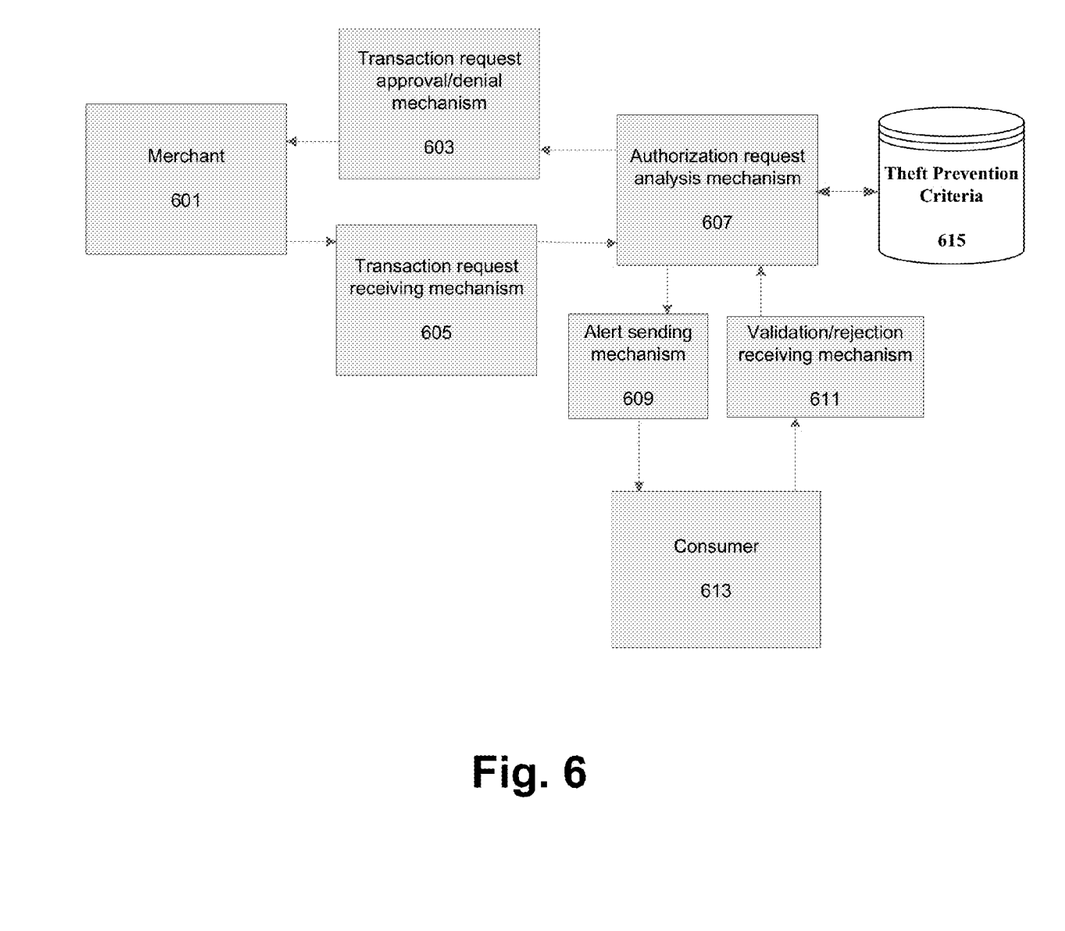
FIG. 6 is a block diagram illustrating a lower level view of an example system for remotely authenticating credit card transactions.

An authorization request is sent from the location of the consumer's credit card transaction 301 over the communications link 307 to the credit card company 303. The credit card company may then send an alert 315 to the consumer's communication device 305 and/or locate the consumer's communication device 305 using cellular triangulation methods 507. A consumer's cell phone 305 or other communication device 305 that uses cellular technology may be located with known methods of triangulation using three cell phone towers 501 503 505 that are in communication with the cell phone or communication device 305 as shown in FIG. 5. This information may be obtained, for example, from cellular telephone service providers and provided to the credit card company 303. Depending on where the consumer's communication device 305 is located compared to the location of the consumer's credit card transaction 301, the credit card company may send an authorization code 313 to the location of the consumer's credit card transaction 301 to complete the transaction. For example, if there is criteria set by the credit card company 303 or the consumer that certain types of transactions must be located 301 within a maximum distance from the consumer's communication device 305, and using the triangulation 507, it is determined by the credit card company 303 that this criteria is met for a particular transaction, then the credit card company 303 may send an authorization code 313 to complete the transaction. If the location criteria is not met, then the credit card company 303 may send a rejection or warning 403 (as shown in FIG. 4), or an alert 315 to the consumer's cell phone 305. The consumer may then perhaps choose to respond to the alert 315 validating 317 the transaction that did not meet the location criteria (as shown in FIG. 6), not respond at all to the alert (not shown), or respond with a rejection of the transaction 401 (as shown in FIG. 4). If the consumer responded to the alert 315 with a validation 317, then credit card company sends an authorization message 313 to the location of the consumer's credit card transaction 301 to indicate to the merchant that the transaction which did not meet the location criteria is allowed to complete. Overall, the location of the communication device and the location of the transaction may be taken into consideration in a number of ways in analyzing the transaction for theft deterrence purposes.

Referring next to FIG. 6, shown is a block diagram illustrating a lower level view of an example system for remotely authenticating credit card transactions. Shown are a merchant 601, a transaction request approval/denial mechanism 603, a transaction request receiving mechanism 605, an authorization request analysis mechanism 607, an alert sending mechanism 609, a validation receiving mechanism 611, a consumer 613, and a persistent storage device for theft prevention criteria 615.

The transaction request receiving mechanism 605 is operable for receiving the transaction requests from the merchant 601, wherever the merchant 601 may be. The transaction request receiving mechanism 605 may be located at the credit card company, for example, and is able to receive messages from the merchant 601 (and other merchants) and relay them to the authorization request analysis mechanism 607 in a form that the authorization request analysis mechanism 607 can receive properly, understand and analyze to determine whether the request should be granted or not. The transaction request approval/denial mechanism 603 sends the result of the analysis performed by the authorization request analysis mechanism 607 in a manner that the merchant or merchant's system 601 can understand and receive properly. In performing the analysis, the authorization request analysis mechanism 607 communicates with the consumer 613 via the alert sending mechanism 609 and the validation/rejection receiving mechanism 611. For example, an alert is sent from the alert sending mechanism 609 when a transaction request from the transaction request receiving mechanism 605 meets certain criteria stored in the theft prevention criteria storage device 615. The alert sending mechanism 609 sends alerts to the consumer in a format suitable for the consumer's communication device 305 (not shown) to receive properly. The validation/rejection receiving mechanism 611 receives validation or rejection responses from the consumer 613 and communicates them to the authorization request analysis mechanism 607 in a format that can be understood and acted upon by the authorization request analysis mechanism 607.

Figure 7:
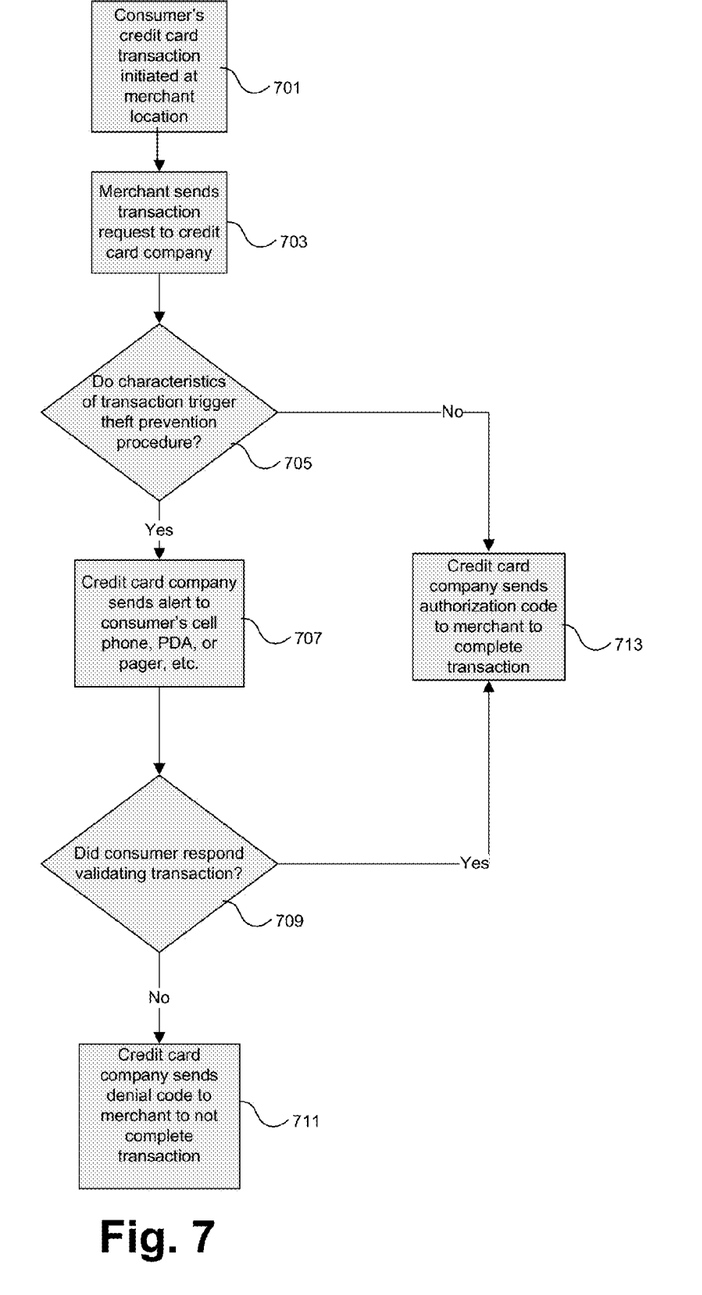
FIG. 7 is a is a flow diagram illustrating an example process for remotely authenticating credit card transactions.

Referring next to FIG. 7, shown is a flow diagram illustrating an example process for remotely authenticating credit card transactions. Note that the flow chart provides one example and multiple other variations on the process and systems described therein are possible and contemplated.

First, a consumer's credit card transaction is initiated 701 at a merchant location. Next, the merchant sends 703 a transaction request to the credit card company. It is then determined 705 (usually at the credit card company, but may also be at the merchant location) whether the characteristics of the transaction associated with the request compared to certain criteria trigger a theft prevention procedure. These characteristics and criteria may include, but are not limited to: the type or amount of the transaction, the type of product being purchased, the frequency of previous transactions of the same type or amount, how the transaction compares to previous transactions, the location of the transaction itself or relative to locations of other transactions, whether the transaction is located at the same location or near the consumer or consumer's communication device (see FIG. 5), whether a signature is required for the transaction, whether the consumer has indicated that category or type of transaction is to trigger an alert or other theft prevention procedure, whether the consumer has indicated that category or type of transaction is not to trigger an alert or other theft prevention procedure, whether the transaction indicates an unusual hike in spending amount, or any other criteria or characteristics of transactions that may be set by the consumer or credit card company.

If it is determined that the characteristics of the transaction do trigger a theft prevention procedure, the credit card company sends 707 an alert to consumer communication device (cell phone, PDA, computer, or pager, etc.). If it is determined that the characteristics of the transaction do not trigger a theft prevention procedure, then the credit card company sends 713 an authorization code to the merchant to complete the transaction. If an alert is sent 707, it is then determined 709 whether the consumer responded to the alert to validate the transaction. If the consumer did not respond to the alert validating the transaction, then the credit card company sends 711 a denial code, for example, to the merchant to not complete the transaction.

Figure 8:
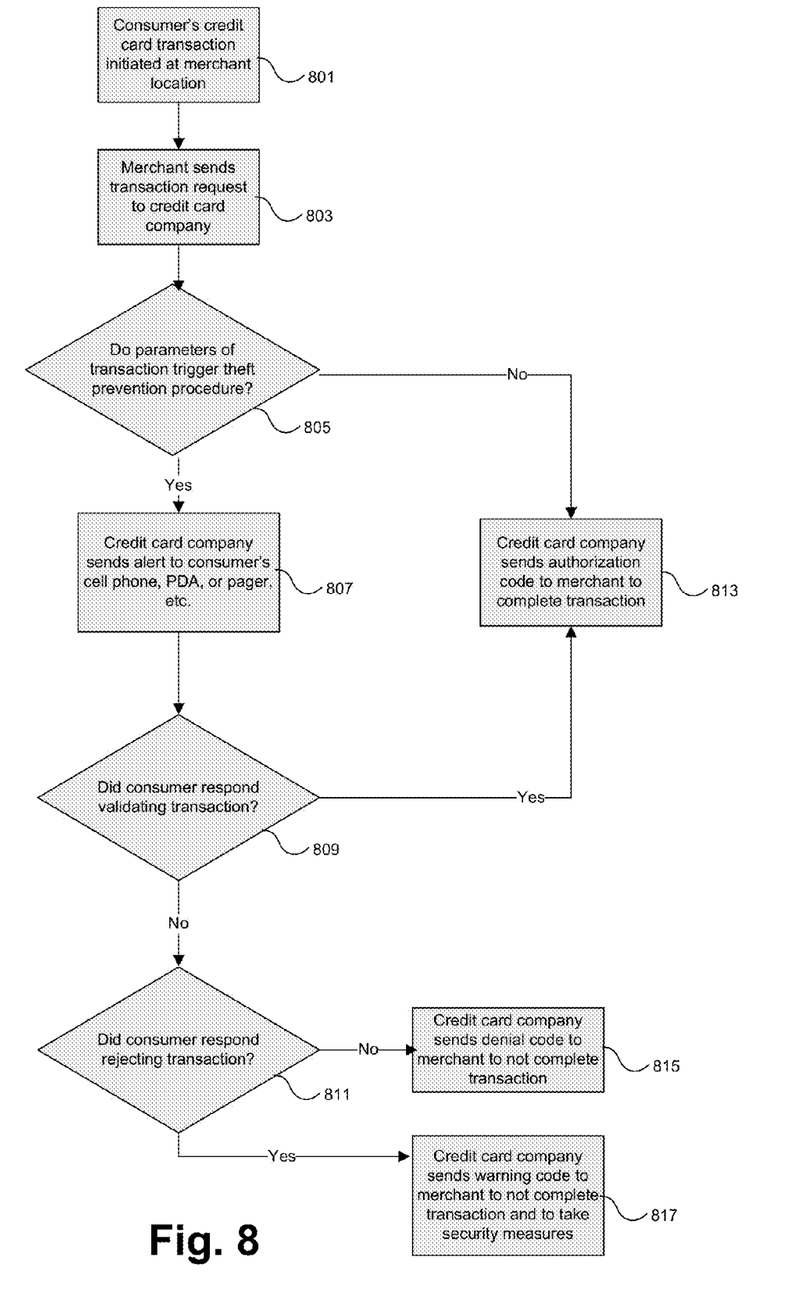
FIG. 8 is a is a flow diagram illustrating an example process for remotely authenticating credit card transactions including managing a transaction rejection by the consumer.

Referring next to FIG. 8, shown is a flow diagram illustrating an example process for remotely authenticating credit card transactions including managing a transaction rejection by the consumer.

First, a consumer's credit card transaction is initiated 801 at a merchant location. Next, the merchant sends 803 a transaction request to the credit card company. It is then determined 805 whether the characteristics of the transaction associated with the request compared to certain criteria trigger a theft prevention procedure. An example list of criteria and transaction characteristics appears above in the description of FIG. 7.

If it is determined that the characteristics of the transaction do trigger a theft prevention procedure, the credit card company sends 807 an alert to consumer communication device (cell phone, PDA, computer, or pager, etc.). If it is determined that the characteristics of the transaction do not trigger a theft prevention procedure, then the credit card company sends 813 an authorization code to the merchant to complete the transaction. If an alert is sent 708, it is then determined 809 whether the consumer responded to the alert to validate the transaction. If the consumer did not respond to the alert validating the transaction, it is then determined 811 whether the consumer responded rejecting the transaction. If the consumer did respond rejecting the transaction, then the credit card company sends 817 a warning code to the merchant to not complete the transaction and to perhaps take security measures such as collecting the credit card or rounding up the suspect, for example. If the consumer did not respond rejecting the transaction, then the credit card company merely sends 815 a denial code to the merchant to not complete the transaction. Also, the credit card company's actions to perform in case there is no response by the consumer to the alert may vary and may be set by the consumer or credit card company. For one example, the consumer may set a policy that the credit card company is to authorize the transaction to complete if there is no response to an alert sent to the consumer. Also, the amount of time that the credit cad company waits for a response may vary as well and may be set by either the consumer, credit card company or merchant, for example.

Figure 9:
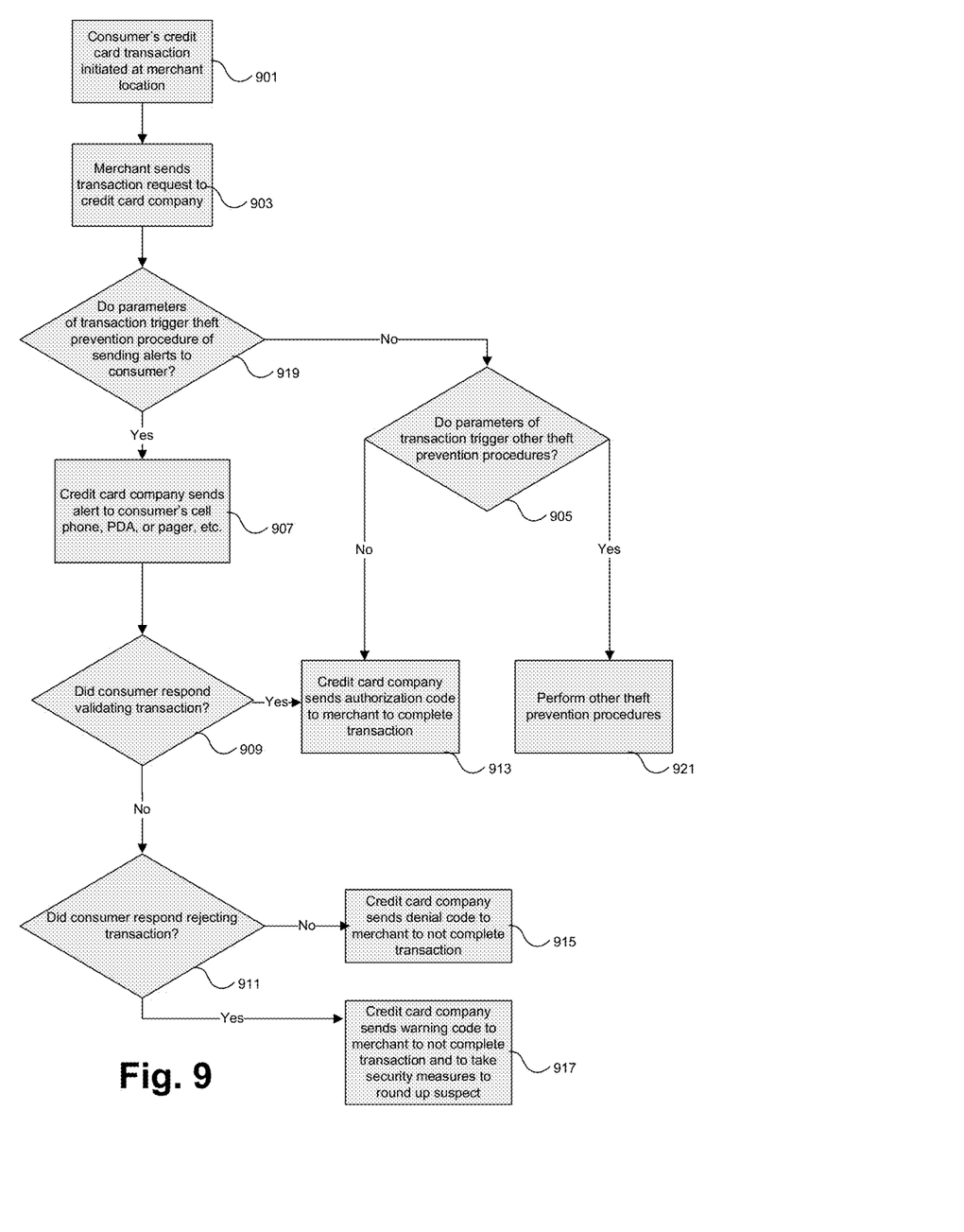
FIG. 9 is a flow diagram illustrating an example process for remotely authenticating credit card transactions including managing a plurality of theft prevention procedures based on different criteria.

Referring next to FIG. 9, shown is a flow diagram illustrating an example process for remotely authenticating credit card transactions including managing a plurality of theft prevention procedures based on different criteria.

First, a consumer's credit card transaction is initiated 901 at a merchant location. Next, the merchant sends 903 a transaction request to the credit card company. It is then determined 919 whether the characteristics of the transaction associated with the request compared to certain criteria trigger a theft prevention procedure of sending an alert to the consumer's communication device. An example list of criteria and transaction characteristics appears above in the description of FIG. 7.

If it is determined that the characteristics of the transaction do trigger a theft prevention procedure of sending an alert to the consumer's communication device, the credit card company sends 907 an alert to consumer communication device (cell phone, PDA, computer, or pager, etc.). If it is determined that the characteristics of the transaction do not trigger a theft prevention procedure of sending an alert to the consumer's communication device, then it is determined 905 whether the characteristics of the transaction associated with the request compared to certain criteria trigger other theft prevention procedures. If the characteristics of the transaction associated with the request compared to certain criteria trigger other theft prevention procedures, then these other theft prevention procedures are performed 921. Other theft prevention procedures may include, but are not limited to: a block on the credit card, a hold on the transaction, subsequent communication to the consumer inquiring about the transaction after the transaction is completed or seeking validation by the consumer after the transaction is completed, communications to the merchant indicating the card is stolen, etc. If the characteristics of the transaction associated with the request compared to certain criteria do not trigger other theft prevention procedures, then the credit card company sends 913 an authorization code to the merchant to complete the transaction.

If it is determined that the characteristics of the transaction do trigger a theft prevention procedure of sending an alert to the consumer's communication device and an alert is sent 708, it is then determined 909 whether the consumer responded to the alert to validate the transaction. If the consumer did not respond to the alert validating the transaction, it is then determined 911 whether the consumer responded rejecting the transaction. If the consumer did respond rejecting the transaction, then the credit card company sends 917 a warning code to the merchant to not complete the transaction and to perhaps take security measures such as collecting the credit card or rounding up the suspect, for example. If the consumer did not respond rejecting the transaction, then the credit card company merely sends 915 a denial code to the merchant to not complete the transaction. Again, the credit card company's actions to perform in case there is no response by the consumer to the alert may vary and may be set by the consumer or credit card company.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the systems and methods described herein.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method of remotely authenticating credit card transactions of a consumer comprising:
    receiving an authorization request from a merchant via a first communication link, the merchant having an identified location;
    determining a location of a mobile device associated with the consumer;
    comparing, using a processor, the location of the merchant with the location of the mobile device;
    based on the comparison, determining whether predetermined location criteria is met,
        wherein the predetermined location criteria comprises a maximum distance between the location of the mobile device and the location of the merchant;
    sending an authorization code to the merchant to complete the credit card transaction if the predetermined location criteria is met; and
    sending a communication via a second communication link to the mobile device if the predetermined location criteria is not met;
        if a rejection is received in response to the communication, sending a denial code to the merchant to disallow the transaction and warning the merchant that an unauthorized credit card transaction is being attempted;
        if a validation is received in response to the communication, sending the authorization code to the merchant to complete the credit card transaction; and
        if no response is received in response to the communication within a predefined period of time, sending an authorization code to the merchant to complete the credit card transaction.

2. The method of claim 1, wherein the predetermined location criteria is determined by the consumer or the credit card company.

3. The method of claim 1, wherein the maximum distance is determined by at least one of: type of transaction, type of product being purchased, relative location of other transactions, or transaction amount.

4. The method of claim 1, wherein determining the location of the mobile device comprises using cell phone triangulation.

5. The method of claim 1, further comprising:
    determining that a type of the credit card transaction does not require a communication; and
    sending the authorization code to the merchant to complete the credit card transaction.

6. The method of claim 1, wherein the predefined time is determined by the consumer.

7. A non-transitory, computer-readable medium comprising instructions for remotely authenticating credit card transactions of a consumer, which, when executed by a processor, direct the processor to perform a method comprising:
    receiving an authorization request from a merchant via a first communication link, the merchant having an identified location;
    determining a location of a mobile device associated with the consumer;
    comparing the location of the merchant with the location of the mobile device;
    based on the comparison, determining whether predetermined location criteria is met,
        wherein the predetermined location criteria comprises a maximum distance between the location of the mobile device and the location of the merchant;
    sending an authorization code to the merchant to complete the credit card transaction if the predetermined location criteria is met; and
    sending a communication via a second communication link to the mobile device if the predetermined location criteria is not met;
        if a rejection is received in response to the communication, sending a denial code to the merchant to disallow the transaction and warning the merchant that an unauthorized credit card transaction is being attempted;
        if a validation is received in response to the communication, sending the authorization code to the merchant to complete the credit card transaction; and
        if no response is received in response to the communication within a predefined period of time, sending an authorization code to the merchant to complete the credit card transaction.

8. The non-transitory, computer-readable medium of claim 7, wherein the predetermined location criteria is determined by the consumer or the credit card company.

9. The non-transitory, computer-readable medium of claim 7, wherein the maximum distance is determined by at least one of: type of transaction, type of product being purchased, relative location of other transactions, or transaction amount.

10. The non-transitory, computer-readable medium of claim 7, wherein determining the location of the mobile device comprises using cell phone triangulation.

11. The non-transitory, computer-readable medium of claim 7, wherein method further comprises:
    determining that a type of the credit card transaction does not require a communication; and
    sending the authorization code to the merchant to complete the credit card transaction.

12. The non-transitory computer-readable medium of claim 7, wherein the predefined time is determined by the credit card company.

13. A system for remotely authenticating credit card transactions of a consumer comprising:
    a transaction request receiving mechanism operable to receive an authorization request from a merchant via a first communication link, the merchant having an identified location;
    an authorization request analysis mechanism operable to:
        determine a location of a mobile device associated with the consumer;
        compare the location of the merchant with the location of the mobile device; and
        based on the comparison, determine whether predetermined location criteria is met,
            wherein the predetermined location criteria comprises a maximum distance between the location of the mobile device and the location of the merchant;
    an alert sending mechanism operable to send a communication via a second communication link to the mobile device if the predetermined location criteria is not met;
    a validation/rejection mechanism operable to:
        receive a rejection or validation from the consumer in response to the communication; and
    a transaction request approval/denial mechanism operable to:
        send a denial code to the merchant to disallow the transaction and warn the merchant that an unauthorized credit card transaction is being attempted if a rejection is received in response to the communication,
        send an authorization code to the merchant to complete the credit card transaction if a validation is received in response to the communication,
        send an authorization code to the merchant to complete the credit card transaction if no response is received in response to the communication within a predefined period of time set by the merchant, and
        send an authorization code to the merchant to complete the credit card transaction if the predetermined location criteria is met.

14. The system of claim 13, wherein the predetermined location criteria is determined by the consumer or the credit card company.

15. The system of claim 13, wherein the maximum distance is determined by at least one of: type of transaction, type of product being purchased, relative location of other transactions, or transaction amount.

16. The system of claim 13, wherein the authorization request analysis mechanism is further operable to:
    determine that a type of the credit card transaction does not require a communication; and
    send the authorization code to the merchant to complete the credit card transaction.

17. The system of claim 13, wherein the predefined time is determined by the consumer.

* * * * *

UNITED STATES PATENT AND TRADEMARK OFFICE
CERTIFICATE OF CORRECTION

PATENT NO. : 8,666,894 B1  
APPLICATION NO. : 13/248790  
DATED : March 4, 2014  
INVENTOR(S) : Amit Buch and Steven Dale Zettner Page 1 of 1

It is certified that error appears in the above-identified patent and that said Letters Patent is hereby corrected as shown below:

Claims column 15, line 5, claim 11 after "wherein" insert --the--.

column 15, line 10, claim 13 after "non-transitory" insert --,--.

Signed and Sealed this
Sixteenth Day of February, 2016

Michelle K. Lee
*Director of the United States Patent and Trademark Office*